(No Model.)

W. WARD.
SAW.

No. 364,787. Patented June 14, 1887.

ATTEST:
W. H. Power
John Ernst

INVENTOR:
William Ward.
Jas. E. Thomas
By Atty.

UNITED STATES PATENT OFFICE.

WILLIAM WARD, OF BAY CITY, MICHIGAN.

SAW.

SPECIFICATION forming part of Letters Patent No. 364,787, dated June 14, 1887.

Application filed January 4, 1887. Serial No. 223,348. (No model.) Patented in Canada June 9, 1886, No. 41,483.

*To all whom it may concern:*

Be it known that I, WILLIAM WARD, a citizen of the United States, residing at Bay City, in the county of Bay and State of Michigan, have invented certain new and useful Improvements in Saws, (for which I have obtained a patent in Canada, No. 41,483, and bearing date June 9, 1886;) and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of saws to which a longitudinal working strain is given in order to provide the plate with a proper rigidity or stiffness; and it consists in forming a series of slits across and in the central portion of the width of the saw-plate.

As saws of this class, such as band and gang saws, are usually constructed of a thin plate, it is necessary to apply to the plate a rigid end strain, in order that it may properly operate in cutting the log and form smooth and evenly-cut lumber, and through the means of this working strain and the additional strain of cutting the log, the front and rear edges of the plate having less support than the central portion, are liable to slightly stretch, while the central portion of the plate, being supported by the front and rear portions, remains solid and firm. This causes the plate to appear limber and loose, or to "buckle," as it is commonly called. More and heavier end strain is then placed on the plate, in order to impart the required rigidity thereto, and soon overstraining causes the saw to crack and break, and sometimes other breakages of the straining apparatus take place, causing expense, delays, and annoyance, and finally the saw must be hammered or rolled in order to put it again in proper form for successful operation. This again causes delay and expense, as only an expert can obtain the required result; and the object of this invention is to obviate these difficulties by so forming the saw-plate that the longitudinal central portion of the plate is entirely relieved from end strain, and that the entire working strain is placed upon the front and rear portions of the plate, and the usual amount of working strain is hence reduced and still the proper rigidity and stiffness is retained.

In the accompanying drawings are illustrated the devices by means of which I attain these objects.

Figure 1:
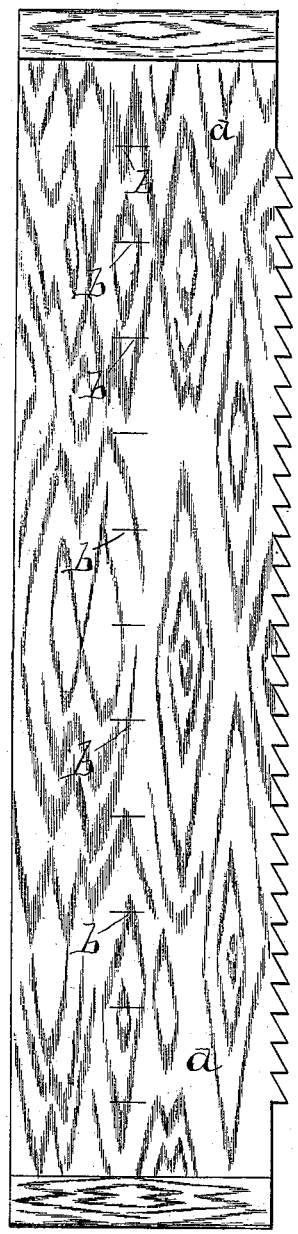
Figure 2:
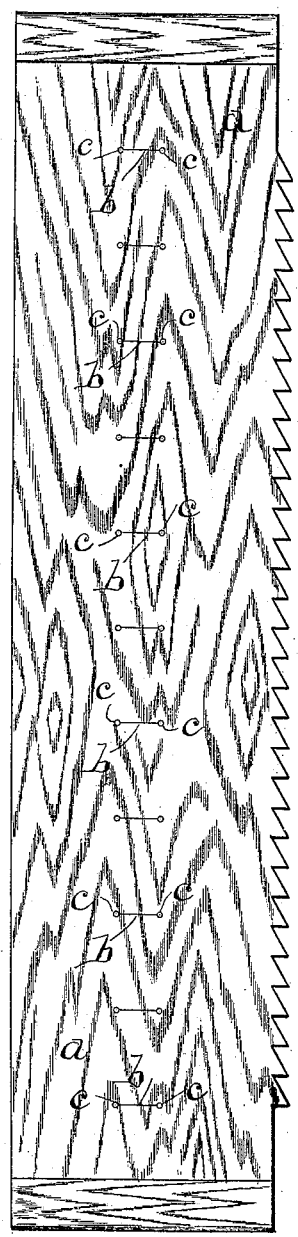
Figure 3:
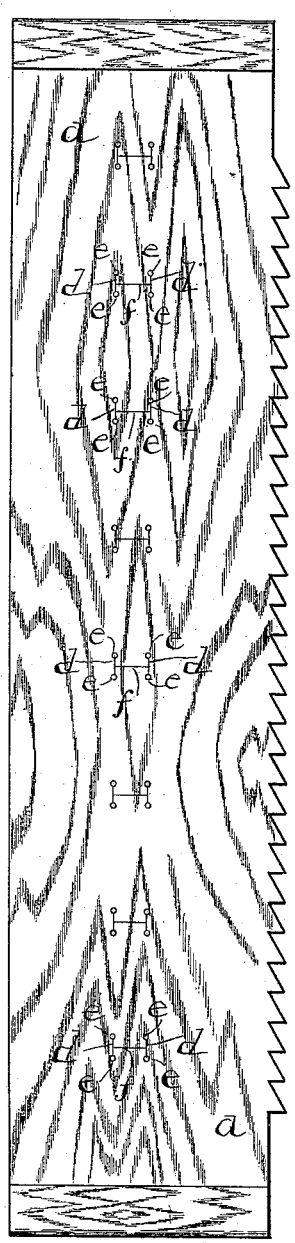

Figure 1 is a side view of a saw-plate containing my improvement. Figs. 2 and 3 are the same as it is used on saws of a thicker plate or heavier gage.

$a$ represents the plate or blade of an ordinary gang-saw, and $b$ are slits cut through the plate in the central portion of its width and at regular intervals for the entire length of the saw-plate. These slits $b$ are formed by dividing the material of the plate without removing any portion thereof, and in order to prevent any further extension of the slits the small circular openings $c$ are formed at the ends of the slits $b$, as shown in Fig. 2. Slits formed in this manner are best adapted to band or thin gang saws, as the stretch or elongation in thin saws is usually less than in saws of a thicker gage. In thicker saws the form of slit shown in Fig. 3 is used.

$d$ are a series of short longitudinal slits, formed in pairs, a short distance between and near the central portion of the plate, and are provided with small end openings, $e$, to prevent any tendency to check farther into the plate from the ends of the slits, and a cross-slit, $f$, is formed, dividing in the middle portion between the slits $d$. This form of opening the central portion of the saw-plate distributes the stretching action over a greater area, and on plates of medium thickness allows the saws to be run with an easier working strain and reduces the number of cross-slits.

In operation the longitudinal working strain is placed upon the saw in the usual manner, and the central portion of the plate being divided, as described, the entire strain is transferred to operate upon the solid portions in the front and rear of the slits, or upon the parts where rigidity and stiffness is of the greatest benefit; and the width of the portions being in reality only from the ends of the slits to the front and rear edges of the plate, they are so reduced and divided that no buckling or uneven stretching of the parts can take place, and the strain required for proper work is so much less that the saw wears much longer and is easier fitted up and kept in repair, and produces smoother lumber.

Openings in the central portions of saw-plates have been used for various purposes, such as for engagement with teeth of sprocket-wheels and for holding and forming cutters of various forms, but in openings for those purposes more or less material is removed, which allows the sawdust, bark, and slivers to pass into the opening and be drawn into the saw-kerf, causing the saw to dodge and cut unevenly, and often, especially in gang-saws cutting logs with the bark still on, breakage of the saw takes place; but with my improvement no openings are required except the small round openings at the ends of the slits, the material of the plate being only divided so that should any stretching of the parts occur the slit is still so narrow that nothing can enter between the parts, and the plate is left full and even.

What I claim as my invention, and desire to secure by Letters Patent, is—

1. In a saw having a longitudinal working strain, a series of slits cut through and extending partially across the central portion of the saw-plate, and with the edges of the slits meeting each other, substantially as and for the purpose set forth.

2. In a saw having a longitudinal working strain, a series of longitudinal slits cut in pairs a short distance between and in the central portion of the plate, and a series of cross-slits dividing the portions between the longitudinal slits, and with their inner edges meeting each other, substantially as and for the purpose set forth.

In testimony whereof I affix my signature in presence of two witnesses.

WILLIAM WARD.

Witnesses:
J. E. THOMAS,
W. H. POWER.